(12) United States Patent
Martin et al.

(10) Patent No.: US 8,262,037 B1
(45) Date of Patent: Sep. 11, 2012

(54) AUTOMATION DEVICE AND SYSTEMS PACKAGING AND PACKAGING METHODS FOR ENERGY MANAGEMENT AND OTHER APPLICATIONS

(75) Inventors: Henry Martin, Hampstead, MD (US); Cyrus Etemad-Moghadam, Fallston, MD (US)

(73) Assignee: Autami Corporation, Columbia, MD (US)

( * ) Notice: Subject to any disclaimer, the term of this patent is extended or adjusted under 35 U.S.C. 154(b) by 260 days.

(21) Appl. No.: 12/611,930

(22) Filed: Nov. 3, 2009

Related U.S. Application Data (60) Provisional application No. 61/110,792, filed on Nov. 3, 2008.

(51) Int. Cl.
*F16M 11/04* (2006.01)
(52) U.S. Cl. ............ 248/176.3; 248/312; 248/460
(58) Field of Classification Search ........... 248/460, 248/155.5, 177.1, 187.1, 550, 176.3, 183.2, 248/186.1, 186.2, 230.1, 309.1, 224.7, 312; 348/158; 396/421, 428; 24/455, 489, 490, 24/491, 492; 269/900, 904, 77, 78
See application file for complete search history.

(56) References Cited

U.S. PATENT DOCUMENTS

| | | | | |
|---|---|---|---|---|
| 4,752,794 A * | 6/1988 | Bohannon | | 396/189 |
| 5,963,749 A * | 10/1999 | Nicholson | | 396/421 |
| 6,554,500 B2 * | 4/2003 | Melitopoulos | | 396/428 |
| 7,546,780 B2 * | 6/2009 | Santos | | 73/866.5 |
| 7,681,846 B1 * | 3/2010 | Mijailovic | | 248/181.1 |
| 7,881,896 B2 * | 2/2011 | Atwell et al. | | 702/95 |
| 2007/0212057 A1 * | 9/2007 | Liang | | 396/428 |
| 2008/0309765 A1 * | 12/2008 | Dayan et al. | | 348/158 |

* cited by examiner

*Primary Examiner* — Tan Le (57) ABSTRACT

An automation system including a plurality of peripheral devices, each configured to perform at least one function relating to energy consumption in a facility and an automation controller in communication with the plurality of peripheral devices and providing for the control of the performance of the function by each device. The peripheral device can be deployed in a peripheral package that includes at least a base portion that is attachable to a structure, a device portion configured to support the peripheral device and to detachably cooperate with the base portion to secure the base portion to the structure. The peripheral package is assembled and cooperates without external fasteners.

10 Claims, 8 Drawing Sheets

AUTOMATION DEVICE AND SYSTEMS PACKAGING AND PACKAGING METHODS FOR ENERGY MANAGEMENT AND OTHER APPLICATIONS

CROSS-REFERENCE TO RELATED APPLICATIONS

This application claims the benefit of U.S. Provisional Patent Application No. 61/110,792 filed Nov. 3, 2008.

STATEMENT REGARDING FEDERALLY-SPONSORED RESEARCH AND DEVELOPMENT

Not Applicable.

FIELD OF THE INVENTION

The present invention is directed generally to automation systems and, more specifically, to peripheral devices and peripheral device packages used in those systems.

BACKGROUND OF THE INVENTION

Automation of the work and leisure environment is a concept that has been long pursued. Despite the continued pursuit, widespread automation, particularly in the home, has not gone much beyond the use of timers, programmable thermostats, and universal remote controls for audio and video equipment.

In the home, higher levels of automation have been left to the domain of the hobbyist and high net worth individuals. A major reason being that home automation systems tend to be difficult to implement and maintain and/or extremely expensive relative to the utility and benefits of the system. Also, the solutions tend to be one size fits all, where the benefits associated with the systems are realized with large system deployments, irrespective of whether a person wants to automate an individual socket, a room, or an entire facility.

X10 has been the most widely implemented protocol in the home automation industry. X10 is a low-speed, unidirectional PowerLine Communication/Carrier (PLC) solution that uses a home electrical power wiring to communicate with various devices that control the various functions in the home, such as light switches, wall receptacles, thermostats, etc. Common criticisms of X10 are directed toward its reliability and robustness, as well as the level of user-friendliness. As such, these systems have been left to hobbyist and those people willing to pay professional contractors to install and/or maintain the systems. Other PLC protocols have been developed to address the criticisms of X10, which have enhanced performance and user experience, but have not substantially broadened the market for these products.

The high-end of the residential market has typically been addressed by comprehensive and expensive stand-alone systems, which often require the use of professional services firms to install and possibly maintain the system. These systems can be integrated with other systems, such as security and intercom systems, to defray the cost of system ownership. In addition to the price of the comprehensive system, the cost and inconvenience associated with providing an infrastructure to support these systems in existing structures has further constrained the market.

The emergence of wireless communication technology and digital media has reinvigorated the automation market, particularly the home market. New wireless protocols and standards are being developed and adopted to support wireless automation systems. The wireless systems are not constrained by power lines and do not require expensive wiring to build out a separate communication network or retrofit an existing structure.

Currently, there are two emerging protocols being introduced in the $1^{st}$ generation of standard wireless automation products, namely Zigbee and Z-Wave. Both protocols attempt to provide a wireless networking standard that supports low data rates, low power consumption, security and reliability. Zigbee is open standard based on IEEE 802.15.4, while Z-Wave is a proprietary standard developed by Zensys, Inc., the current sole source for the chips that implement the protocol.

Many of the high-end automation system vendors have developed media center systems for the distribution and control of audio and video signals throughout the structure, which also include some home automation functionality. The media center provides control over various automation devices deployed in the structure and typically be accessed locally by a computer or remotely via the Internet. A universal remote control is typically provided, which communicates with the media center, which, in turn, communicates with the audio, video, and automation devices.

Other products employ a gateway controller that is controlled from a remote network operations center ("NOC") via a network connection into the structure. The gateway controller controls devices in the structure based on information provided by the NOC and provide status information to the NOC. A remote control is provided to allow for control of the individual automation devices without having to reprogram the device through the NOC.

Outside the home in non-residential settings, whether it is for or non-profit, academic, governmental, social, etc., owners and tenants face challenges similar to those in the residential market. Non-residential energy consumers can employ highly sophisticated systems for controlling their heating, ventilation, and air conditioning ("HVAC"), as well as for access control and information technology. Otherwise, these consumers are also generally limited to the use of programmable thermostats and motion controlled lighting.

As such, most energy consumers have little visibility into their energy consumption patterns. The lack of visibility makes it difficult to modify or tailor consumption patterns to reduce the energy consumed or the cost of the energy being consumed. Furthermore, participation in utility based conservation programs, such as demand-response programs, is typically limited to those residential and non-residential facilities that can operate with periodic interruptions of their air conditioning systems.

Improved automation solutions are required that overcome the various limitations associated with prior art solutions to enable high quality, cost effective, and scalable automation solutions for homes and businesses that can applied by the end users to their particular automation needs.

BRIEF SUMMARY OF THE INVENTION

The present invention provides, among other things, a cost effective means for deploying automation technology. Peripheral devices, such as sensors, cameras, microphones, etc., are deployed in an integrated fastener package that provides for a low cost, mass producible package, which eliminates the need for external fasteners, such as screws, bolts, clips, solder, welds, glue, etc., that add parts and labor cost to the package.

In various embodiments, the peripheral package provides a universal mounting package that enables different types of peripheral devices to be deployed with a common peripheral package and installation and maintenance procedure. The common peripheral package can include both mounting slots and clasps in a base portion for attaching to a structure, in combination with a device portion that houses one or more peripheral devices. In various embodiments, the peripheral package also includes a retaining portion for wiring from the peripheral device mounted in the package.

In various embodiments, the package is enabled by various rotational devices, joints, etc., such as a ball and socket joint, universal joints, pivots/axes to provide 360 degree coverage. However, adjustable assemblies that provide less than 360 coverage can be implemented, as appropriate in some implementations.

The device portion may be detachable from the base portion of the package to allow separate installation and maintenance of the base and device portions. For example, the base portion of the package could be mounted to, or integrated with, a wall, ceiling, or other structure in advance of the installation of the device portion of the package and the peripheral device. Similarly, the detachable structure improves maintenance and upgradability of the device portions and peripheral devices.

The peripheral package may be constructed from any material that is sufficiently durable to retain at least one peripheral device, such as a sensor, camera, microphone, etc. With the objective of producing a low cost, maintainable part, low cost plastics that can be injection molded and have sufficient durability to be deformed to some extent are well suited for the application. The skilled artisan will appreciate that other materials that have the features recited in the preceding sentence may be suitable for use. In addition, the choice of materials may be varied to accommodate the use of the package for additional purposes, such as supporting items in addition to, or in lieu of, peripheral devices, such as decorations, etc.

The present invention addresses limitations of the prior art as will become apparent from the specification and drawings.

BRIEF DESCRIPTION OF THE SEVERAL VIEWS OF THE DRAWING

The accompanying drawings are included for the purpose of exemplary illustration of various aspects of the present invention, and not for purposes of limiting the invention, wherein:

FIGS. 2-13 show various embodiments of the peripheral package and its components.

It will be appreciated that the implementations, features, etc. described with respect to embodiments in specific figures are exemplary and may be implemented with respect to other embodiments in other figures, unless expressly stated, or otherwise not possible.

DETAILED DESCRIPTION OF THE INVENTION

Figure 1:
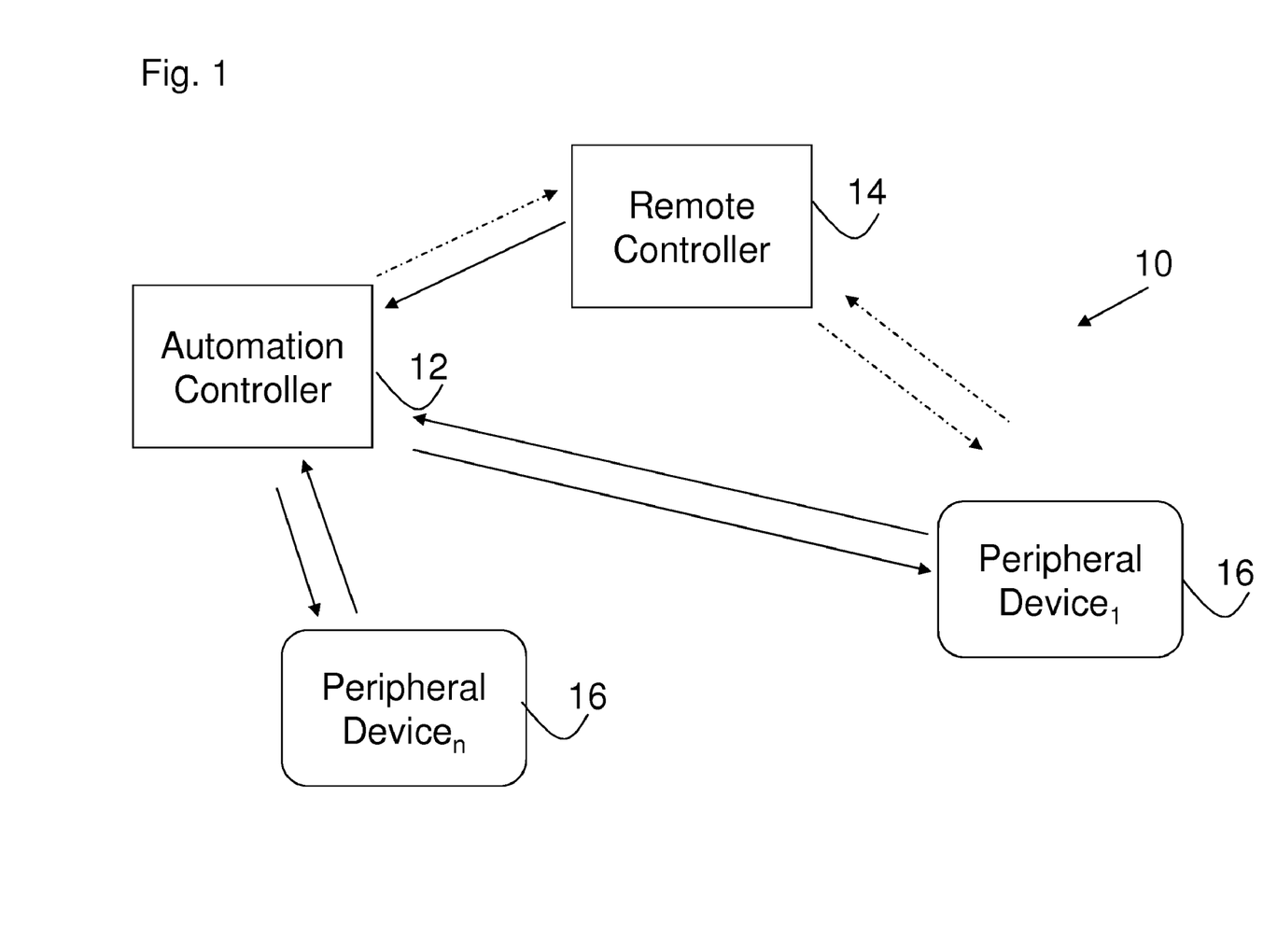
FIG. 1 shows embodiments of automation systems.

FIG. 1 depicts an automation system 10 embodiment of the present invention. The system 10 includes various components, such as an automation controller 12, a remote controller 14, and one or more peripheral devices $16_{1-n}$. In this embodiment, the automation controller 12 has two way communications with the peripheral device 16 (as shown by the solid arrows). It also has at least one way communication with the remote controller 14, and, optionally two way communications with the remote controller 14 (as indicated by the dashed arrows). In addition, the remote controller 14 can have optional one or two way communications with one or more of the peripheral devices $16_{1-n}$.

Communication between the automation controller 12 and the peripheral devices 16 can be wired and/or wireless depending upon the particular implementation. Wired communication can make use of the power lines, local area networks, or direct links between communication ports, such as USB, RS-232 and 485, etc. Wireless communications can employ one or more wireless technologies, such as Zigbee, Z-wave, Bluetooth, and/or other proprietary and/or open standard, e.g., IEEE 802.x, communication protocols transmitting signals in the infrared and/or radio frequency spectrum. As mentioned above, Zigbee and Z-wave are protocols that have been developed specifically for applications, such as automation, where some of the devices used in the system, such as those operating on battery power, may require low power, reliable, non-line of sight communication.

In embodiments such as FIG. 1, the automation controller 12 may serve as a peer or slave to the remote controller 14 depending upon the desired level of functionality and communication between the controllers. For example, when one way communication is provided from the remote controller 14, the automation controller 12 will act only as a slave performing an operation in response to a command/input from the remote controller 14. In embodiments providing for two way communication, the controllers may serve as peers or as a master and slave depending upon the configuration of the system 10. For example, if the only communication from the automation controller 12 to the remote controller 14 is to send information requested by remote controller 14, then the automation controller 12 will operate as a slave to the command/input sent by the user via the remote controller 14. Conversely, if the automation controller 12 can request/command certain actions be taken by the remote controller 14, such as report a status, then the controllers will most likely be operating in a peer relationship.

Embodiments based on FIG. 1 may include one or two way communication between the remote controller 14 and one or more of the peripheral devices 16. The remote to peripheral communication can provide primary, secondary, or alternate communications. For example, the remote controller 14 may be configured merely to serve as a repeater, and thus a peer to peripheral devices 16, for communications between the automation controller 12 and the peripheral devices 16. The remote controller 14 may send a command to the peripheral device 16 that is redundant of command sent by the automation controller 12.

Also, the remote controller 14 may send the only command to the peripheral device 16. In this instance, the automation controller 12 may be configured to receive this command from the remote controller 14 or the remote controller 14 may send a different command, such as a generic change of state command to the automation controller 12. Upon receipt of a command directed to a peripheral device by the remote controller 14, the automation controller 12 could 1) query the peripheral devices 16 immediately or at a predetermined time to determine its operational state or 2) await a communication from the peripheral devices 16 directly, and/or indirectly via the remote controller 14, indicating their state.

In the present invention, a peripheral package 20 is provided to support various peripheral devices 16, such as sensors, cameras, microphones, etc. that are deployed in the automation system 10. The peripheral package 20 is an integrated fastener package designed to be low cost and mass producible. The peripheral package of the present invention eliminates the need to use external fasteners, such as screws, bolts, clips, solder, welds, glue, etc., in the manufacture of the package 20, thereby reducing the parts and labor cost of the package 20.

In various embodiments, the peripheral package 20 provides a universal mounting package that enables different types of peripheral devices 16 to be deployed with a common peripheral package and installation and maintenance procedure. While it would be desirable to have a single common package 20 across all peripheral devices 16, one of ordinary skill will appreciate that due to the plethora of peripheral devices 16 and functions, it may be more cost effective to have common package designs for groups of peripheral devices 16 rather than a single package for all devices 16.

Generally, the peripheral package 20 can include one or more mounting slots or holes (passive attachment) and/or integrated clasps, clips, etc. (active attachment) for attaching the package 20 to a structure. Other affixing means for attaching the package 20 to a structure can also be provided. For example, the package 20 may typically include a flat surface suitable for mounting to a structure with adhesives, Velcro, magnets, etc.

The package 20 generally includes at least two portions, a base portion 22 and a device portion 24 that are detachable from each other. In various embodiments, the peripheral package 20 may include a retaining portion 26 for wiring from the peripheral device 16 mounted in the package 20. It will be appreciated that the package could include multiple base portions 22, device portions 24, and peripheral device 16.

The detachable nature of the base portion 22 and device portion 24 allow separate installation and maintenance of these portions. For example, the base portion 22 of the package 20 could be mounted to, or integrated with, a wall, ceiling, or other structure in advance of the installation of the device portion 24 of the package and the peripheral device 16. Furthermore, the detachable structure improves maintenance and upgradability of the device portions 24 and peripheral devices 16.

The peripheral package 20 may be constructed from any material that is sufficiently durable to retain at least one peripheral device, such as a sensor, camera, microphone, etc. for a desired interval. With the objective of producing a low cost, maintainable part, low cost plastics that can be injection molded and have material properties suitable for the application. The skilled artisan will appreciate that other materials that have the features recited herein may be suitable for use. In addition, the choice of materials may be varied to accommodate the use of the package 20 for additional purposes, such as supporting items in addition to, or in lieu of, peripheral devices 16, such as decorations, etc.

In various embodiments, the package 20 includes adjustable portions 28 and fixed portions 30. The adjustable portions 28 enable the peripheral devices 16 to be positioned as desired relative to the structure. The adjustable portions 28 can be enabled by one or more various rotational devices and joints, such as a ball and socket joint, universal joints, pivots, gears, etc. to provide 360 degree coverage within the spirit of the invention. Adjustable portions 28 that provide less than 360 degree coverage can be implemented, as appropriate in some implementations.

The adjustable portions 28 can be associated with one or both of the base portion 22 and device portion 24, as will be evident from exemplary embodiments described herein. For example, when the adjustable portion is embodied as a ball and socket joint, the base portion 22 may be a rigid structure that includes the socket and the device portion 24 includes the ball portion of the joint.

Figures 2A, 2B, 3:
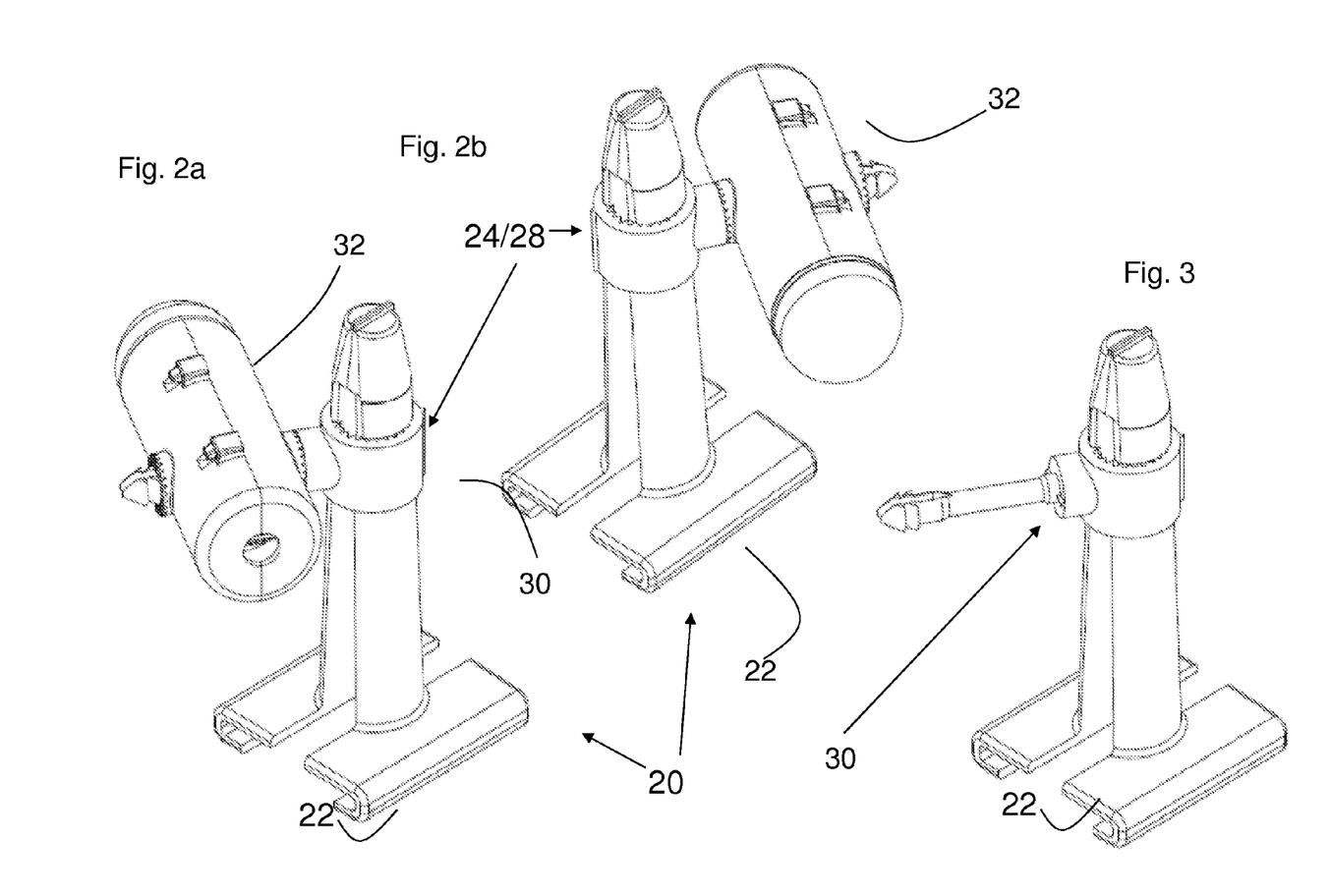
Figures 4A, 4B:
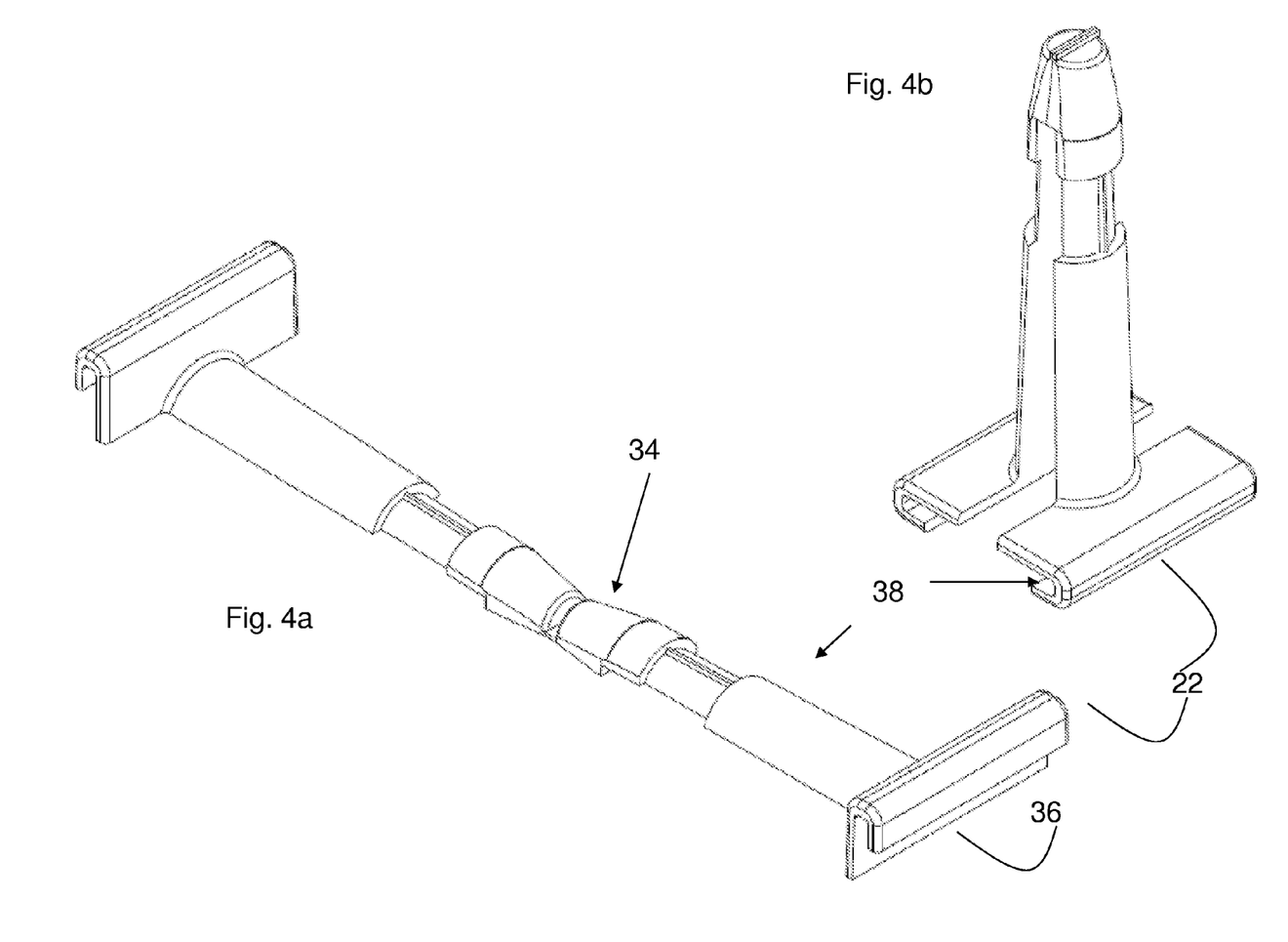
Figure 5:
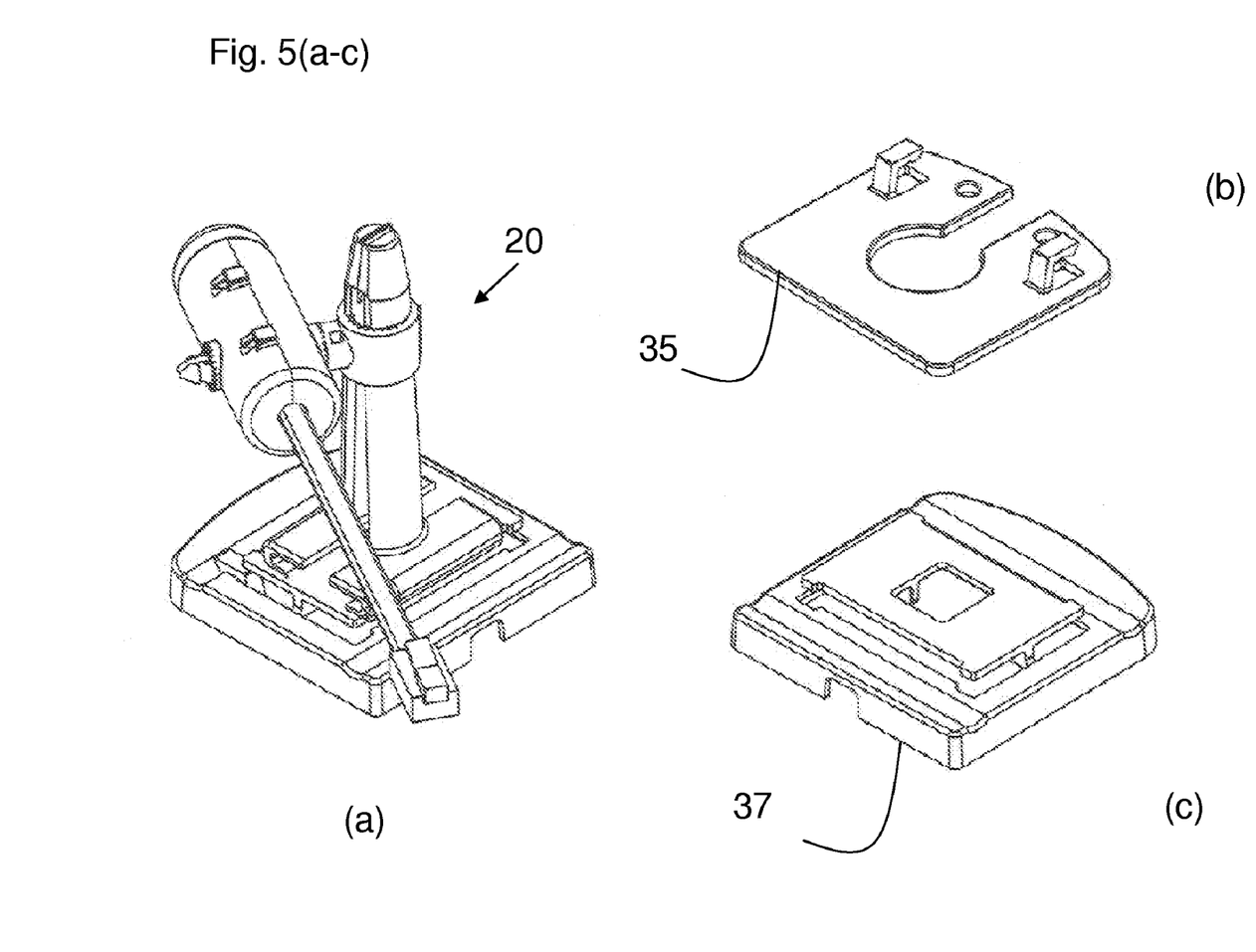

FIGS. 2-13 show various embodiments of the peripheral package and its components. FIG. 2*a* shows an assembled package 20 including the base portion 22 and device portion 24. The device portion 24 includes a pivot 30 and a housing 32 for supporting the peripheral device 16. In these embodiments, the entire device portion 24 is the adjustable portion 28, as the pivot 30 cooperates with the base portion 22 to rotate around its axis. FIG. 3 shows the base portion 22 with pivot 30 connected without the housing 32. FIG. 4*a* shows the base portion 22 in an unfolded arrangement as it might look if the part is manufactured by injection molding. The unfolded part uses a living hinge 34 to connect two halves of the base portion 22, which are folded along the living hinge as shown in FIG. 4*b*. These embodiments enable the as-folded base portion to further serve as a clasp, clamp, or other active fastener 36 for attachment to structure. For example, the clamping active fastener 36 can be used to clamp the package 20 to a rail structure, such as used in a drop ceiling, or to a wall-mounted rail structure, such as shown in FIGS. 5(*a-c*).

FIGS. 5(*b-c*) show a 2 piece exemplary embodiment in which a wall mount section 35 can be easily attached to a structure and cooperate with the package section 37 to attached the package 20 to the structure as in FIG. 5(*a*). Notably, the wall mount structure is constructed without the need for external fasteners, such as screws, bolts, rivets, glue, etc. to assemble the package or the mount. External fasteners may be required to attach the package 20 to the structure. One of ordinary skill will appreciate that it may be desirable to use external fasteners in some aspects of a deployment of system 10 employing the present invention.

The active fastener can include various features, such as friction of locking teeth, 38 that enable base portion 22 to be securely fastened to the structure. It will be appreciated that the base can also be designed to include passive fastening components, such slots or holes, that can be used with screws, nails, and/or other fasteners to attach the package 20 to the structure.

Figure 6:
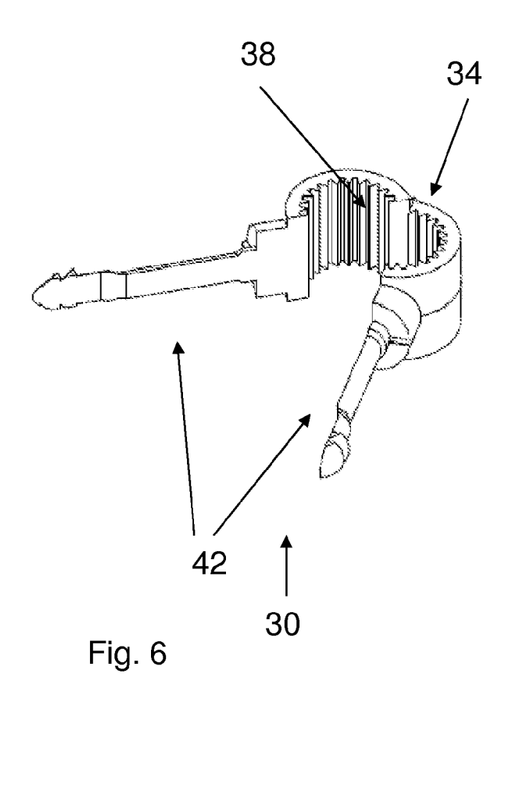
Figures 7, 8:
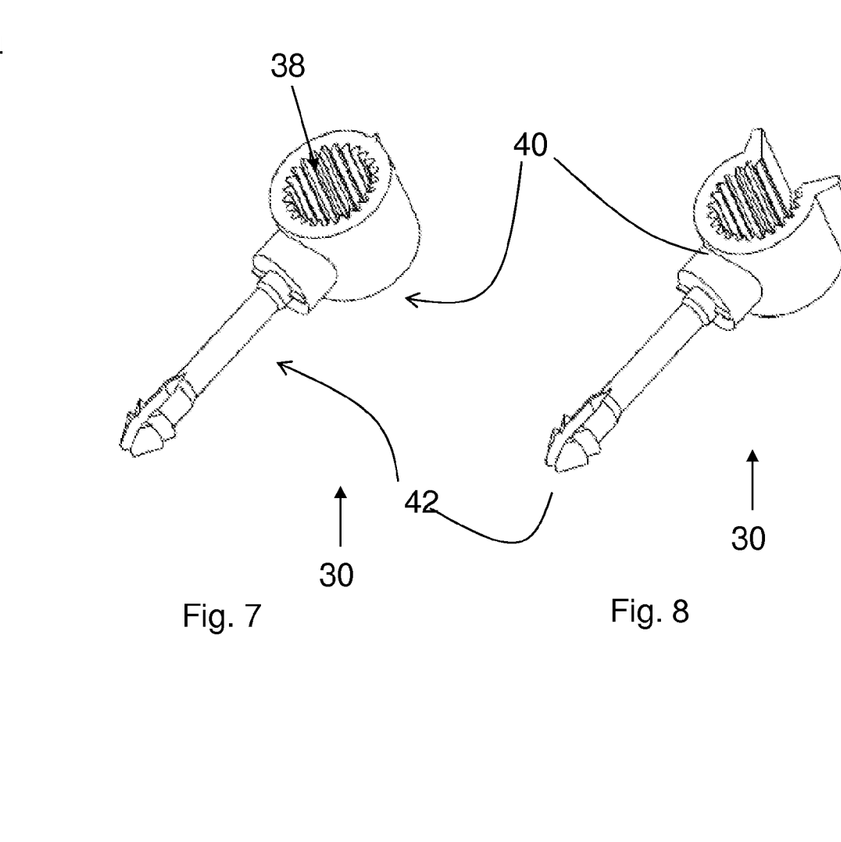

FIGS. 6-8 show various aspects of the pivot 30. In these embodiments, the pivot 30 includes a rotational collar portion 40 for attachment to the base portion 22 and a pivot shaft 42 for supporting the housing 32. The pivot shaft 42 further includes a compliant end portion with a snap on attachment feature for coupling to the housing 32. The collar portion 40 and/or the base portion 22 can include friction or interlocking teeth features 38 to restrict the rotational movement of the pivot 30 around the base portion 22. FIG. 6 shows the pivot 30 including a living hinge 34, so the pivot 30 can be attached to the base portion 22 by wrapping the pivot 30 around the base portion 22. FIG. 7 shows the collar portion 40 as a continuous slip fit part and a unitary pivot shaft 42. FIG. 8 shows the collar portion 40 employing a snap on attachment means. It will be appreciated that one of ordinary skill can implement a wide variety of methods and designs to restrict the relative motion of the various portions of the package depending upon the desired use.

Figure 9A:
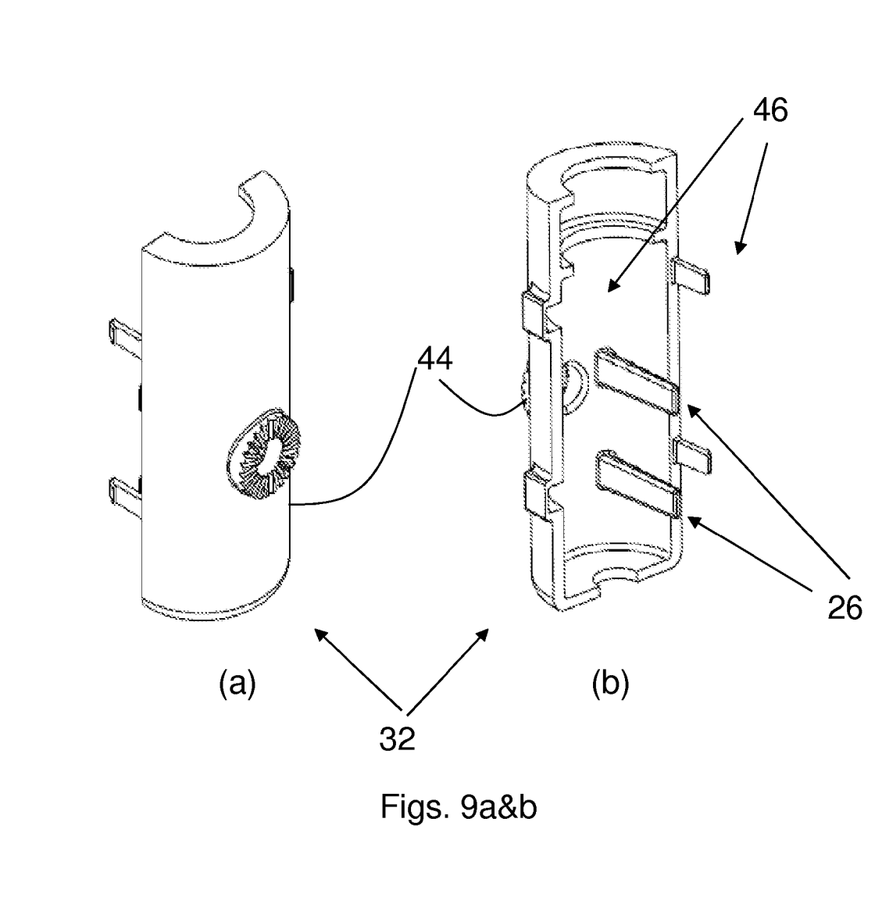
Figure 10:
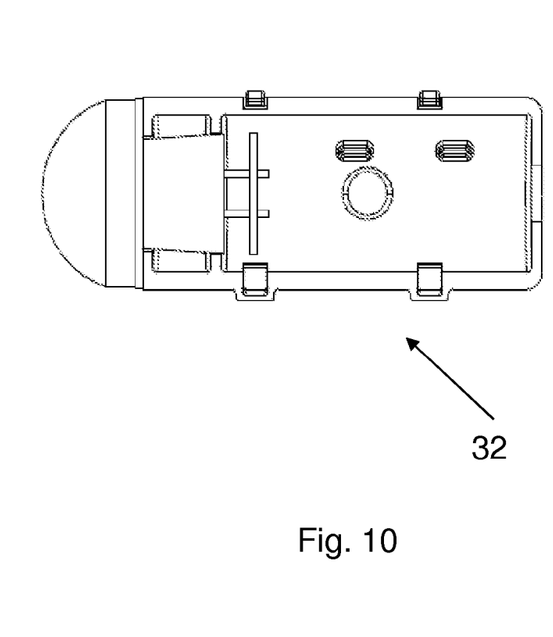

FIGS. 9-10 show various aspects of housing 32 embodiments of the present invention. FIGS. 9*a*&*b* show the housing 32 in two part that mate to form the housing 32. It will be appreciated that the housing 32 can be a unitary part or formed from two or more parts. While the housing 32 is shown as two separate parts in FIGS. 9*a*&*b*, it will be appreciated that the housing 32 can also be designed/manufactured with a living hinge 34, similar to that shown in FIGS. 4-6.

FIG. 9a shows the outside of the housing 32 include a receiving portion 44 that mates with the pivot 30. The housing 32 includes integrated fasteners 46 to couple the two parts of the housing 32 together. While these embodiments show an integrated snap fastener 46, it can be appreciated other integrated fasteners may also be used, such as barbed shaft/hole fastener. It may be desirable to employ an integrated fastener that can be readily opened and closed to allow for maintenance of peripheral devices 16 supported by the housing 32. FIG. 9b further shows wire routing and strain relief portion 26 that can be included, as needed in the housing 32.

FIGS. 9a&b show the receiving portion 44 on both sides of the housing 32, thereby allowing the pivot shaft 42 to pass through the housing 32. In these embodiments and others where the pivot shaft 42 passes into the housing 32, the pivot shaft 42 can be used to provide support or retain the peripheral device 16 in the housing. It will be appreciated that the pivot shaft can attach to the outside of the housing 32.

FIG. 10 shows a plan view of one part of the housing 32 with a peripheral device 16 seated in one end of the housing 32. The interior design of the housing can include various features to support various peripheral device types, wiring and antenna features, as well as impart various structural attributes to the housing 32.

Figure 11:
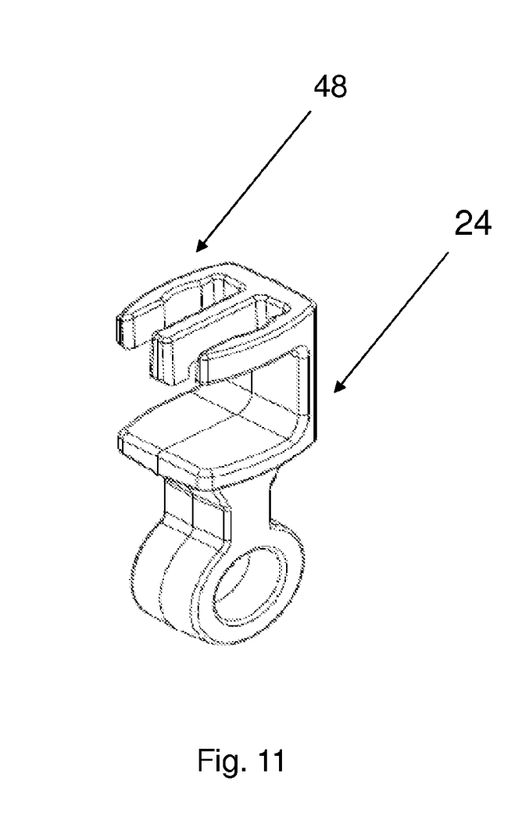
Figure 12:
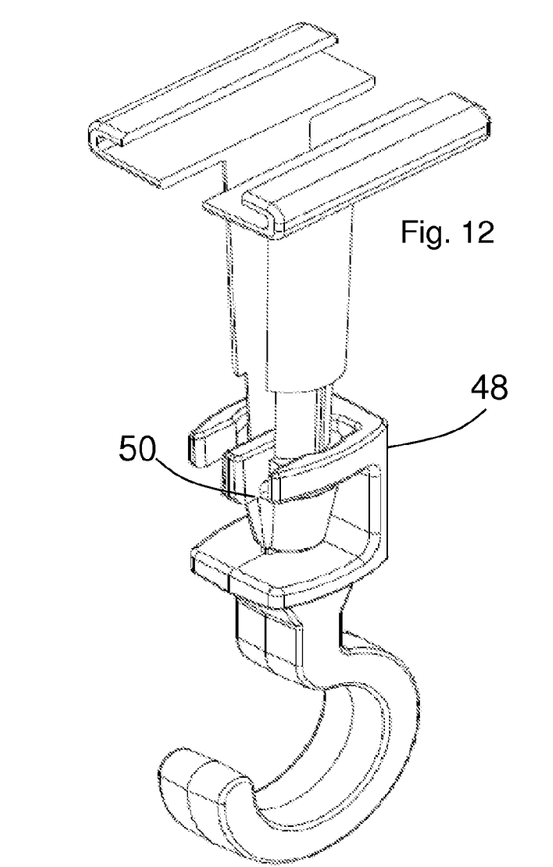

FIGS. 11&12 show the package 20 with other embodiments for the device portion 24 and how the device portion 24 is coupled to the base portion 22. In these embodiments, the base portion 22 has a two part shaft that forms an interlocking coupling with a corresponding coupling the device portion 24. In these embodiments, the interlocking coupling on the device portion 22 includes a snap feature to assist with holding the two parts of the base portion 22 together. Conversely, the base portion 22 can include a lip 50 to help support the device portion 24. In addition, the middle prong of coupling embodiments in FIGS. 11 & 12 can be eliminated to enable the device portion 24 to rotate around the shaft of the base portion 22.

Figure 13A:
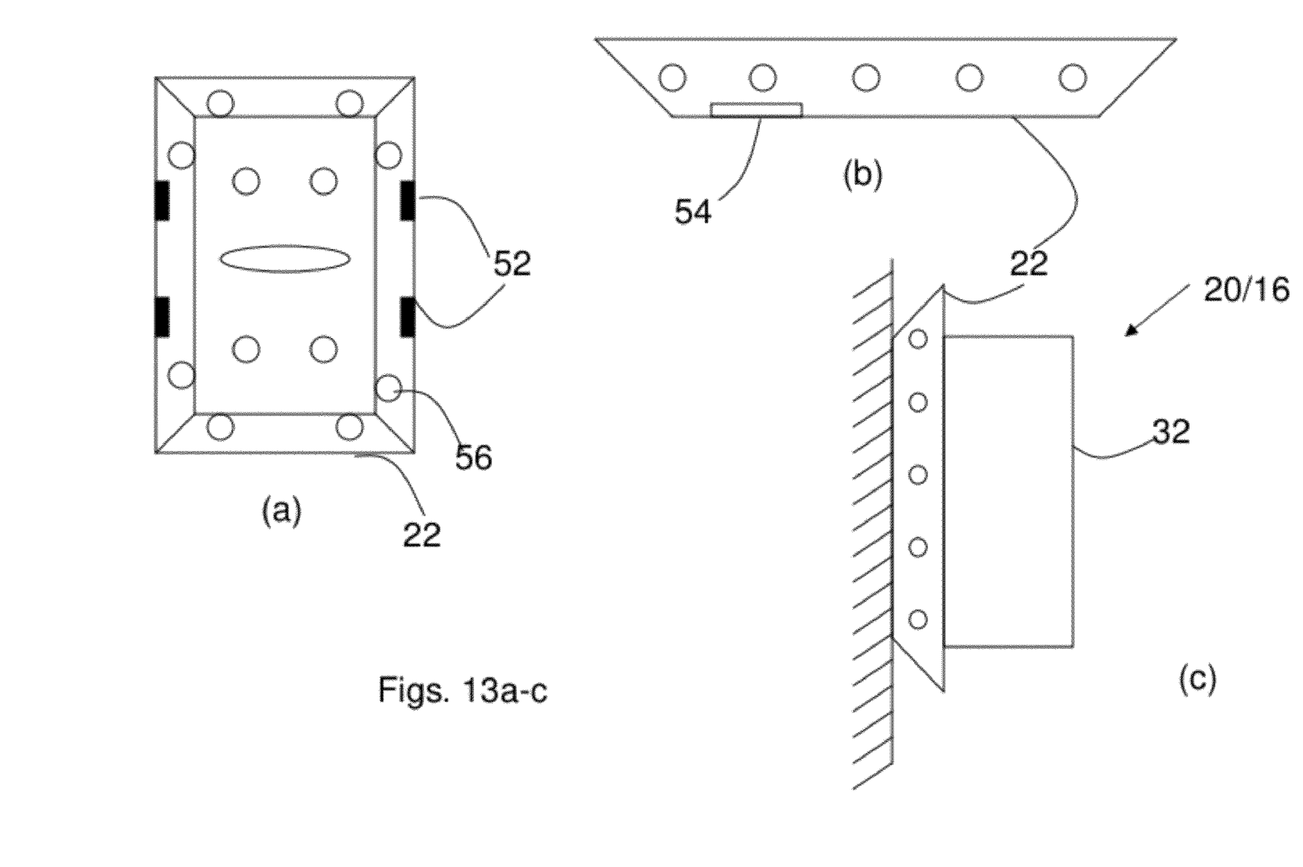

FIGS. 13a-c shows exemplary embodiments of peripheral package 20 include the base portion 22, which is attached to a structure. The device portion 26 is detachably connected to the base portion 22 employing integrated fasteners 52 in the device and/or base portion. In some embodiments, a connector 54 or wiring access for wired communications and/or power can be provided in the base portion 22 to support the peripheral device 16 housed in the package 20.

In FIG. 13 embodiments, the base portion 22 is configured to have multiple non-planar mounting surfaces to enable it to be attached to a variety of structures in a facility at a variety of angles to enable the peripheral devices 16 that are installed in the package 20 to be positioned where desired. These embodiments can provide for a fixed mounting of the peripheral device 16 or enable adjustment of the peripheral devices 16 through the inclusion of an adjustable portion as described above. The base portion 22 can included various other feature known to one of ordinary skill including openings 56 to facilitate fastening, air flow, weight, access, etc.

FIGS. 2-13 show various embodiments of the integrated fasteners, which can be discrete features, such as those in FIGS. 9a&b and 13. In various embodiments shown in the figures, the integrated fasteners 46 can be embodied in the form of one portion serving as a fastener for another portion. For example, in embodiments such as FIG. 2a&b, the base portion 22 can include discrete integrated fasteners 46, such as those shown in FIGS. 9-10, or the pivot collar 40 can perform the integrated fastener function. Similarly in FIG. 2a&b, the pivot shaft can include discrete integrated fasteners 46 or the receiving portion 44 can perform the integrated fastener function for fastening the parts of the pivot arm in place. Clearly, one of ordinary skill can conceive of a vast array of potential implementations and fasteners, both known and to be developed. However, it is often desirable that the selection be made to enable low cost manufacturing and ease of installation.

As such, there are various embodiments of the package 20 that include multiple portions, but fewer discrete integrated fasteners, as the various portions are coupled in such a way where the body of one portion serves as the integrated fastener for another portion. For example in FIG. 2a, the pivot 30 serves as the fastener for the base portion 22 and the housing 32 serves as the integrated fastener for the pivot 30. Discrete fasteners 46 can be provided in the housing 32 to complete the assembly of the package 20.

In FIG. 2 embodiments, the pivot collar 40 is mounted on the base portion 22 and the housing 32 is mounted on the pivot shaft 42 to enable the adjustable portion 28 to be rotated around two axes. The various means to provide for adjustment can be provide in the base portion 22 and/or the device portion 24. As described above, different rotational devices, joints, couplings, such as ball and socket, universal joint, can be used depending upon the cost, adjustability, and manufacturability characteristics desired in the package 20.

In practice, installing a peripheral using the package 20 of the present invention follows a general procedure. The base portion is attached to the structure. For example, the base portion 22 of FIG. 4 is folded using the living hinge and clamped onto a rail in a drop ceiling. The pivot 30 can be attached to either the base portion or the housing first followed by connection to the other part. The peripheral device 16 is installed into the housing 32 in the device portion 24, which is secured by integrated fasteners 46. The housing 32 then is attached to the pivot, either before or after the pivot is attached to the base portion 22. Lastly, the adjustable portion 28 of the package 20 is adjusted to place the peripheral device 16 in the proper position to perform its function.

In a more general sense, a peripheral package including a base portion and a device portion, and adjustable portion that are assembled and cooperate using integrated fasteners is provided for installation. The base portion is attached at the location in the structure where it is desired to install a peripheral device configured to perform a function. The device portion including the peripheral device along with a separate or include adjustable portion is attached to the base portion so that the device portion is detachable from the base portion without detaching the base portion from the structure. The device portion can then be adjusted to place the peripheral device in the proper position to perform its desired function.

The package 20 of the present invention can be implemented to provide electrical connectivity for the peripheral devices to the rails of the drop ceiling or other fixturing used to attach the package 20 to the structure. In those instances, the peripheral device 16 may not need a transmitter and/or receiver to communicate with controller 12, but would merely pass signals to and receive from a peripheral device 16 or controller 12 that was remotely located from the device 16 in the package 20. As previously described the peripheral device 16 can include lower cost communication devices that send the signal to another device that transmits/receives signals from the automation controller 12.

These and other variations and modifications of the present invention are possible and contemplated, and it is intended that the foregoing specification and the following claims cover such modifications and variations.

What is claimed is:

1. A peripheral package comprising:
a base portion that is attachable to a structure; and,
a device portion configured to support a peripheral device and to detachably cooperate with the base portion to secure the base portion to the structure, wherein the peripheral package is assembled and cooperates without external fasteners including at least bolts, screws, rivets, and glue,
wherein, the base portion is a substantially fixed portion with a tapered barbed segment;
the device portion includes a receiving portion configured to cooperate with the tapered barbed portion and the device portion is detachable from the base portion by the application of force to at least one of the base portion and the device portion and the tapered barbed portion and receiving portion; and,
an adjustable portion defined by a least a portion of one of the base portion and the device portion and adjustable to move the peripheral device;
wherein, the base portion, device portion, and adjustable portion are assembled and cooperate using integrated fasteners.

2. The package of claim 1, wherein the peripheral package includes an adjustable portion enabling the device portion to be moved relative to the base portion.

3. The package of claim 2, wherein the adjustable portion is configured to secure the base portion to the structure and allow motion of the adjustable portion relative to the base portion.

4. The package of claim 2, wherein the adjustable portion and device portion are configured to allow motion of the device portion relative to the adjustable portion.

5. The package of claim 2, wherein the device portion is configured to secure the adjustable portion to the base portion.

6. The package of claim 1, wherein the adjustable portion enables additional motion of the device portion relative to the base portion.

7. An automation system comprising:
an automation controller configured to control peripheral devices that perform a function;
at least one peripheral device that is deployed in a peripheral package that includes at least:
a base portion that is attachable to a structure;
an adjustable portion configured to cooperate with the base portion to secure the base portion to the structure, and
a device portion configured to support the peripheral device and to detachably cooperate with the adjustable portion to secure the adjustable portion to the base portion, wherein the peripheral package is assembled and cooperates without external fasteners including bolts, screws, rivets, and glue,
wherein, the base portion is a substantially fixed portion with a tapered barbed segment configured to cooperate mechanically with the device portion,
the device portion includes a receiving portion configured to cooperate with the tapered barbed portion, wherein the device portion can be detached from the base portion by the application of force to at least one of the base portion and the device portion and the tapered barbed portion and receiving portion,
the adjustable portion is defined by a least a portion of one of the base portion and the device portion and adjustable to move the peripheral device, and
wherein, the base portion, device portion, and adjustable portion are assembled and cooperate using integrated fasteners.

8. The system of claim 7, wherein the adjustable and device portions of the package include motion restricting sections that cooperate to restrict the relative motion of the adjustable and device portions.

9. The system of claim 8, wherein the motion restricting sections include interlocking sections including teeth that restrict the rotation of the device portion relative to the adjustable portion.

10. A method of positioning a peripheral device in a structure comprising: providing a peripheral package including
a base portion with a tapered barbed portion,
a device portion including a receiving portion configured to cooperate with the tapered barbed portion, and
an adjustable portion defined by a least a portion of one of the base portion and the device portion and adjustable to move a peripheral device, and the base portion, device portion, and adjustable portion are configured to be assembled and cooperate using integrated fasteners;
attaching the base portion within a structure at a location where it is desired to install the peripheral device configured to perform a function;
installing the peripheral device in the device portion;
attaching the device portion and adjustable portion to the base portion via the tapered barbed and receiving portion, so that the device portion is detachable from the base portion without detaching the base portion from the structure; and,
adjusting the device portion to position the peripheral device within the structure to perform a function.

* * * * *

UNITED STATES PATENT AND TRADEMARK OFFICE
CERTIFICATE OF CORRECTION

| | | |
|---|---|---|
| PATENT NO. | : 8,262,037 B1 | Page 1 of 1 |
| APPLICATION NO. | : 12/611930 | |
| DATED | : September 11, 2012 | |
| INVENTOR(S) | : Henry Martin and Cyrus Etemad-Moghadam | |

It is certified that error appears in the above-identified patent and that said Letters Patent is hereby corrected as shown below:

On the Title Page

Applicants Item (73) respectfully request that a Certificate of Correction be issued to change the incorrect spelling "Autami" of the assignee name on the front page of the patent to the correct spelling of "Autani".

Signed and Sealed this
Tenth Day of February, 2015

Michelle K. Lee
*Deputy Director of the United States Patent and Trademark Office*